(12) United States Patent
Nonogi et al.

(10) Patent No.: US 8,371,419 B2
(45) Date of Patent: Feb. 12, 2013

(54) HYBRID SOUND ABSORBING SHEET

(75) Inventors: Mari Nonogi, Sagamihara (JP); Tetsuya Noro, Yokohama (JP); Makoto Sasaki, Mishima (JP)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 12/988,607

(22) PCT Filed: Apr. 10, 2009

(86) PCT No.: PCT/US2009/040209
§ 371 (c)(1),
(2), (4) Date: Apr. 6, 2011

(87) PCT Pub. No.: WO2009/131855
PCT Pub. Date: Oct. 29, 2009

(65) Prior Publication Data
US 2011/0180348 A1 Jul. 28, 2011

Related U.S. Application Data

(60) Provisional application No. 61/046,844, filed on Apr. 22, 2008.

(51) Int. Cl.
*E04B 1/82* (2006.01)
(52) U.S. Cl. ............ 181/290; 181/284; 52/144; 52/145
(58) Field of Classification Search .................. 181/290, 181/284; 52/144, 145
See application file for complete search history.

(56) References Cited

U.S. PATENT DOCUMENTS

| | | | |
|---|---|---|---|
| 3,177,970 A | 4/1965 | Boschi | |
| 3,214,565 A | 10/1965 | Hager, Jr. et al. | |
| 4,128,683 A * | 12/1978 | Nomura et al. | 428/138 |
| 4,559,255 A | 12/1985 | Shimode et al. | |
| 5,192,624 A | 3/1993 | Morimoto | |
| 5,545,861 A | 8/1996 | Morimoto | |
| 5,700,527 A | 12/1997 | Fuchs et al. | |
| 5,744,763 A * | 4/1998 | Iwasa et al. | 181/286 |
| 5,912,442 A | 6/1999 | Nye | |
| 6,345,688 B1 | 2/2002 | Veen et al. | |
| 6,555,246 B1 | 4/2003 | Zwick | |
| 6,598,701 B1 * | 7/2003 | Wood et al. | 181/290 |
| 6,601,673 B2 | 8/2003 | Murakami et al. | |
| 6,617,002 B2 | 9/2003 | Wood | |
| 6,720,069 B1 | 4/2004 | Murakami et al. | |
| 6,769,512 B2 | 8/2004 | Bargo | |
| 6,820,720 B1 | 11/2004 | Nicolai et al. | |
| 6,821,607 B2 * | 11/2004 | Zwick et al. | 428/172 |
| 6,983,822 B2 | 1/2006 | O'Regan et al. | |

(Continued)

FOREIGN PATENT DOCUMENTS

| | | |
|---|---|---|
| EP | 0023618 | 2/1981 |
| EP | 0816583 | 7/1998 |

(Continued)

OTHER PUBLICATIONS

International Search Report for PCT/US2009/040192, mailed Oct. 22, 2009.

(Continued)

*Primary Examiner* — Forrest M Phillips (57) ABSTRACT

A hybrid sound absorbing sheet, comprising a microperforated film and a perforated metal foil disposed on the microperforated film, is provided. Also provided is a hybrid sound absorbing sheet comprising a microperforated film and a perforated metal foil disposed on the microperforated film, wherein the perforated metal foil is embossed.

24 Claims, 10 Drawing Sheets

U.S. PATENT DOCUMENTS

| | | |
|---|---|---|
| 6,997,109 B2 | 2/2006 | Saito |
| 7,279,214 B2 | 10/2007 | Nicolai et al. |
| 2002/0070077 A1* | 6/2002 | Porte et al. .................... 181/292 |
| 2006/0096183 A1 | 5/2006 | Yamaguchi et al. |
| 2006/0124387 A1 | 6/2006 | Berbner et al. |
| 2006/0289229 A1* | 12/2006 | Yamaguchi ................... 181/290 |
| 2007/0122568 A1 | 5/2007 | Blömeling |
| 2007/0227815 A1 | 10/2007 | Nakamura |
| 2007/0272482 A1* | 11/2007 | Yamaguchi et al. .......... 181/290 |
| 2011/0100748 A1 | 5/2011 | Nonogi et al. |
| 2011/0100749 A1 | 5/2011 | Nonogi et al. |

FOREIGN PATENT DOCUMENTS

| | | |
|---|---|---|
| EP | 1775714 | 4/2007 |
| JP | 4037994 | 7/1985 |
| JP | 03-023319 | 1/1991 |
| JP | 3108400 | 5/1991 |
| JP | 04-186397 A | 7/1992 |
| JP | 6-4398 | 2/1994 |
| JP | 60083365 | 3/1994 |
| JP | 7213418 | 8/1995 |
| JP | 08042015 | 2/1996 |
| JP | 8042015 A | 2/1996 |
| JP | 9013943 | 1/1997 |
| JP | 9217955 | 8/1997 |
| JP | 10088689 | 4/1998 |
| JP | 11-062047 A | 3/1999 |
| JP | 2000-020070 A | 1/2000 |
| JP | 2000-144968 | 5/2000 |
| JP | 2001-132132 | 5/2001 |
| JP | 2002-057488 | 2/2002 |
| JP | 2004126487 | 4/2004 |
| JP | 2004-353294 A | 12/2004 |
| JP | 2005-121994 A | 5/2005 |
| JP | 2005-283703 | 10/2005 |
| JP | 2006-153926 A | 6/2006 |
| JP | 2006-323204 | 11/2006 |
| JP | 2007-127908 A | 5/2007 |
| KR | 10-2006-0056384 | 5/2006 |
| WO | WO 2006/021605 | 3/2006 |
| WO | WO 2007/137607 | 12/2007 |

OTHER PUBLICATIONS

International Search Report for PCT/US2009/042937, mailed Dec. 2, 2009.

International Search Report for PCT/US2009/040209, mailed Nov. 24, 2009.

* cited by examiner

HYBRID SOUND ABSORBING SHEET

CROSS REFERENCE TO RELATED APPLICATIONS

This application is a national stage filing under 35 U.S.C. 371 of PCT/US2009/040209, filed Apr. 10, 2009, which claims priority to U.S. Provisional Application No. 61/046844, filed Apr. 22, 2008, the disclosures of which are incorporated by reference in their entirety herein.

FIELD OF THE DISCLOSURE

The present disclosure relates to a hybrid sound absorbing sheet including a microperforated film and a perforated metal foil disposed on the microperforated film.

BACKGROUND

Various kinds of sound absorbers are used in a number of different disciplines for absorbing sound. For example, sound absorbers are often used for electric and electronic equipment. With the continuing emphasis on size reduction and cost reduction of such equipment, thin and flexible sound absorbers are desirable. For electric and electronic equipment, an electromagnetic shielding property is also desirable.

It is thus desirable to provide sound absorbers which are capable of absorbing sounds in a wide range of frequencies, are thin (even including a backing airspace), and have an electromagnetic shielding property and an enhanced thermal conductivity.

SUMMARY

The present disclosure provides a hybrid sound absorbing sheet including a microperforated film (that is, comprising through-micro bores), and a perforated metal foil disposed on the microperforated film. The perforated metal foil may be embossed in various patterns. The hybrid sound absorbing sheet may be relatively thin (for example, it may have a total thickness of about 50 micrometers to 1600 micrometers, about 70 micrometers to 1400 micrometers or 70 micrometers to 750 micrometers); and, it can allow the use of a backing airspace that is relatively thin (for example, about 1 mm to about 20 mm or about 1 mm to about 10 mm). The hybrid sound absorbing sheet may provide effective sound absorption in various frequencies. Further, the hybrid sound absorbing sheet of the present disclosure has an electromagnetic shielding property and a thermal conductivity, which are enhanced by the metal content of the sheet. The hybrid sound absorbing sheet can be used in relatively limited or narrow spaces as are often found in various kinds of electric and electronic equipment or the like.

Thus, herein is disclosed in one aspect a hybrid sound absorbing sheet comprising a microperforated film comprising through-micro bores present in a first pattern; and, a perforated metal foil comprising holes in a second pattern; wherein the perforated metal foil is disposed on the microperforated film, and wherein the first pattern of the through-micro bores in the microperforated film and the second pattern of the perforated metal foil comprise non-aligned patterns.

Herein is also disclosed a method of absorbing sound comprising the steps of: providing a hybrid sound absorbing sheet comprising a microperforated film comprising through-micro bores present in a first pattern and a perforated metal foil comprising holes in a second pattern, wherein the perforated metal foil is disposed on the microperforated film, and wherein the first pattern of the through-micro bores in the microperforated film and the second pattern of the perforated metal foil comprise non-aligned patterns; and, positioning the hybrid sound absorbing sheet between an acoustic source and a sound-reflecting surface, with a backing airspace between the hybrid sound absorbing sheet and the sound-reflecting surface.

Herein is also disclosed a sound absorber, comprising: a sound-reflecting surface and a hybrid sound absorbing sheet disposed near the sound-reflecting surface with a backing airspace between the hybrid sound absorbing sheet and the sound-reflecting surface, wherein the hybrid sound absorbing sheet comprises a microperforated film comprising through-micro bores present in a first pattern and a perforated metal foil comprising holes in a second pattern, wherein the perforated metal foil is disposed on the microperforated film, and wherein the first pattern of the through-micro bores in the microperforated film and the second pattern of the perforated metal foil comprise non-aligned patterns.

The above summary of the present invention is not intended to describe each illustrated embodiment or every implementation of the present invention. The Figures and the detailed description which follow more particularly exemplify these embodiments.

Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 1:
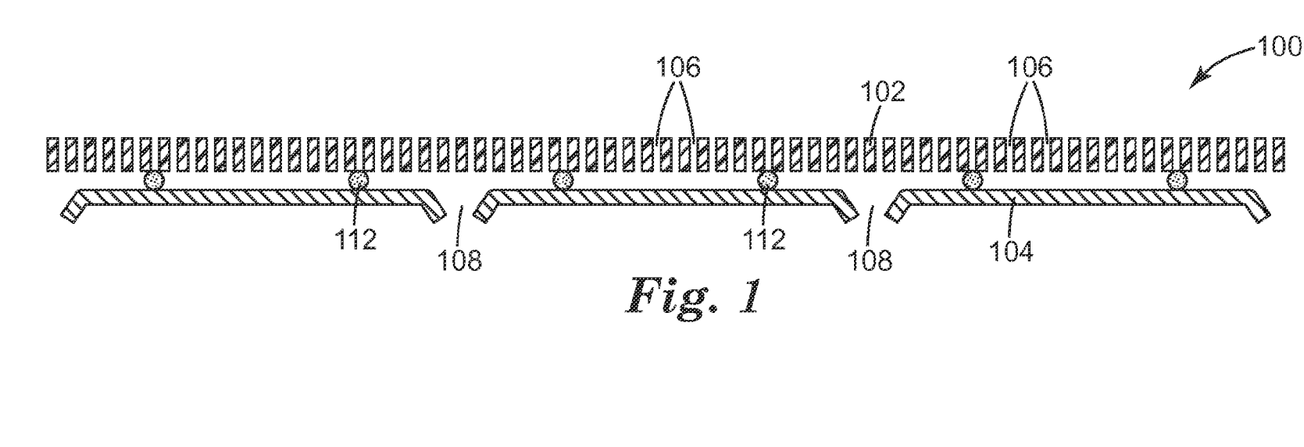
FIG. 1 is a cross-sectional view of one embodiment of the hybrid sound absorbing sheet of the present disclosure.

FIG. 1 is a cross-sectional view of one embodiment of the hybrid sound absorbing sheet of the present disclosure. In this embodiment, hybrid sound absorbing sheet 100 includes a microperforated film 102 and a perforated metal foil 104 disposed on the microperforated film 102. The microperforated film includes through-micro bores 106 that are present in a first pattern and pass completely through film 102. In one embodiment, through-micro bores 106 have a diameter range of about 10 micrometers to about 200 micrometers. In one embodiment through-micro bores 106 are present at a density of from about 77,500 bores per square meter to about 6,200,000 bores per square meter, or about 620,000 bores per square meter to about 3,100,000 bores per square meter. In one embodiment, microperforated film 102 comprises an air permeability of about 0.1 seconds per 100 cc to about 300 seconds per 100 cc (as measured using a GURLEY TYPE DENSOMETER available from Toyo Seiki Seisaku-sho, Ltd, using procedures as outlined in JIS-L-1906). The air permeability value in the Gurley method shows the time it takes 100 cc of air to pass through a film (seconds per 100 cc).

The microperforated film can include, but is not limited to, a resin film having flexibility. Exemplary polymeric materials that can be used for the film include, but are not limited to, polyesters such as polyethylene terephthalate (PET), polybutylene terephthalate (PBT) or polyethylene naphthalate (PEN); polycarbonate; polyolefin such as polyethylene, polypropylene or polybutylene; polyvinyl resins such as polyvinyl chloride, polyvinylidene chloride or polyvinyl acetals; cellulose ester resins such as cellulose triacetate or cellulose acetate. Blends and/or copolymers of these materials may also be used. In one embodiment the thickness of the microperforated film 102 is about 10 micrometers to about 250 micrometers. The weight per unit area of the film is not limited, but can be from about 5 grams per square-meters to about 500 grams per square-meters.

The perforated metal foil 104 includes holes 108 in a second pattern. In one embodiment, the holes have a diameter of about 0.1 mm to about 3.0 mm and a density of about 12,000 holes per square meter to about 6,200,000 holes per square meter, or about 70,000 holes per square meter to about 3,100,000 holes per square meter. The perforated metal foil can be made of materials including, but not limited to, copper, aluminum, iron, tin, titanium, nickel, lead, zinc, silver, gold, and mixtures, blends, and/or alloys thereof. Specific alloys which may find use include for example brass, bronze, stainless steel, beryllium copper or phosphor bronze. The thickness of the perforated metal foil includes, but is not limited to, about 10 micrometers to about 250 micrometers. In one embodiment, the first pattern of the through-micro bores in the microperforated film and the second pattern of the perforations in the perforated metal foil comprise non-aligned patterns, as defined later herein. In one embodiment, the hybrid sound absorbing sheet may have an air gap between at least a part of the microperforated film and a part of the perforated metal foil.

The through microbores in the film, and/or the holes in the foil, may be circular or noncircular (e.g., ovals, slits, squares, etc.), and may be regular or irregular. In the case of noncircular or irregularly shaped microbores or holes, the term "diameter" refers to the diameter of a circular opening having the same area as the opening of the non-circular shaped micro-bore or hole. The microbores and/or holes may also vary in size. In such a case, the diameter refers to the average diameter of the total population of microbores or holes.

By the combination of the film containing through-micro bores, and the perforated foil, excellent sound absorption, electromagnetic shielding property and thermal conductivity can be achieved even with a relatively thin construction and/or with the use of a relatively thin backing air space. While not wishing to be limited by theory or mechanism, the hybrid sound absorbing sheet of the present disclosure may absorb sound, for example, by membrane oscillation of the film, by friction of air in the through-micro bores, by resonance of air in the foil perforations (holes), or by a combination of these mechanisms.

The layers of the hybrid sound absorbing sheet 100 may be prepared by any known method. For example, a film can be microperforated by needle punching with a roll having needles to form through-micro bores. If necessary, a nip roll (a back up roll) can be used for such needle punching. For perforation of the through-micro bores, various kinds of needles can be used, and various kinds of shapes of the through-micro bores may be used. A metal foil can be perforated by needle punching with a roll having needles to form holes.

As disclosed herein, the microperforated film and the perforated metal foil may be disposed adjacent each other. In one embodiment, they are positioned such that at least a portion of the metal foil is in contact with a portion of the microperforated film. In a specific embodiment, they are positioned such that only a portion of the metal foil is in contact with the microperforated film (or, alternatively, is in contact with an adhesive that is itself in contact with the film). Such a configuration can result in an air gap being present between at least a portion of the microperforated film and at least a portion of the perforated metal foil, which may result in improved sound absorption. If the foil is perforated in such a manner as to leave protruding portions (e.g., a protruding rim) around the holes (for example, as shown in an exemplary manner for holes 108 and 208 of FIGS. 1 and 2, respectively), in one embodiment the non-protruding (smooth) side of the foil can be placed adjacent the microperforated film.

In a particular embodiment, the foil is embossed (as discussed later with regard to FIG. 2). Such embossing may advantageously result in the presence of an air gap in between at least a portion of the perforated foil, and at least a portion of the microperforated film.

In one embodiment, the microperforated film and the perforated metal foil are disposed together (e.g. attached together) by any known method such as adhesive bonding, stapling or stitching. In one embodiment, an adhesive is used, with the adhesive being applied (to either the foil or the film) in discrete locations. For example, spraying with droplets of a liquid or hot melt adhesive, or dotting or spot gluing with a liquid adhesive or a hot melt adhesive, or discrete application of bonding tape may be performed. (An example of an adhesive present in a discrete manner is illustrated in FIGS. 1 and 2 by the presence of adhesive elements 112 and 212, respectively). Such discrete application of adhesive, and/or bonding the film and the foil only in discrete locations (as may also be done in a nonadhesive method by, e.g., stapling, stitching, etc.) may advantageously result in the presence of an air gap in between at least a portion of the perforated foil, and the microperforated film, even the metal foil is not embossed. Further, an air gap between the microperforated film and the perforated foil may be produced by laminating a layer having air such as mesh layer or microporous material layer between the film and the foil.

The hybrid sound absorbing sheet as disclosed herein is produced by providing a microperforated film and a perforated foil, and disposing them adjacent each other. In one embodiment, the diameter and spacing of the through-micro bores in the microperforated film are different from the diameter and spacing of the perforations in the foil. In this embodiment, when the two layers are placed in proximity, the through-micro bores in the film and the perforations in the foil will not all line up with each other. That is, while some of the through-micro bores may be in overlapping relation with a hole in the foil, at least some of the through-microbores will be in overlapping relation with a solid portion of the foil (that is, a portion not containing a hole). Such an arrangement (illustrated in an exemplary manner in FIGS. 1 and 2), which is defined herein by the terminology that the microperforated film and the perforated foil comprise non-aligned patterns, is distinguished from an arrangement in which each hole in the film layer is aligned with a hole in the foil layer (such as would be made, for example, in an operation in which a foil layer and a film layer are disposed together, and are then perforated or microperforated in a single operation).

Figure 2:
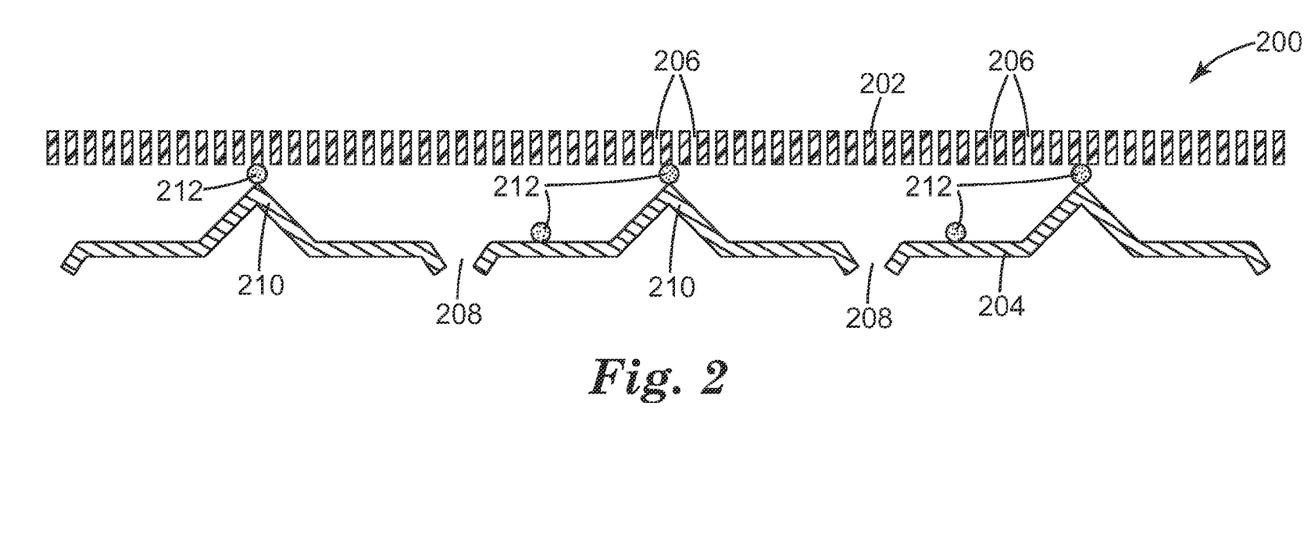
FIG. 2 is a cross-sectional view of another embodiment of the hybrid sound absorbing sheet of the present disclosure.

FIG. 2 is a cross-sectional view of another embodiment of the hybrid sound absorbing sheet of the present disclosure. In this embodiment, hybrid sound absorbing sheet 200 includes a microperforated film 202 and a perforated metal foil 204 disposed on the microperforated film 202. The microperforated film includes through-micro bores 206, which are the same as the through-micro bores 106 mentioned above. Example materials, thickness, and the weight per unit area of the film are the same as mentioned above.

The perforated metal foil 204 includes holes 208 which are the same as the holes 108 mentioned above. The example materials of the perforated metal foil are the same as mentioned above. The perforated metal foil 204 further includes embossed features 210. The pattern of the embossed features is not limited, but can include a stripe pattern, a curvilinear stripe pattern, a grid pattern such as a square grid pattern, a diagonal square grid pattern or a curvilinear square grid pattern, a circular pattern, an ellipsoidal pattern, a linear pattern, a dashed line pattern, a wavy line pattern, a dot pattern or a cylindrical pattern. The pitch (spacing) of the pattern may be, but is not limited to, about 1.0 mm to about 20.0 mm. The depth of the embossed features may be, but is not limited to, about 30 micrometers to about 1000 micrometers, about 50 micrometers to about 800 micrometers, or about 50 micrometers to about 150 micrometers. The thickness of the (unembossed) metal foil can be, but is not limited to, about 10 micrometers to about 250 micrometers. The thickness of the embossed foil (including the emboss depth) can be about 40 micrometers to about 1250 micrometers, about 60 micrometers to about 1050 micrometers or about 60 micrometers to about 400 micrometers. The total thickness of the hybrid sound absorbing sheet including the emboss depth is about 50 micrometers to 1600 micrometers, about 70 micrometers to 1400 micrometers or 70 micrometers to 750 micrometers. Thus, even when comprising an embossed foil, the hybrid sound absorbing sheet of the present disclosure may be well suited for limited or narrow spaces often found in various kinds of electric and electronic equipment or the like.

Figure 12:
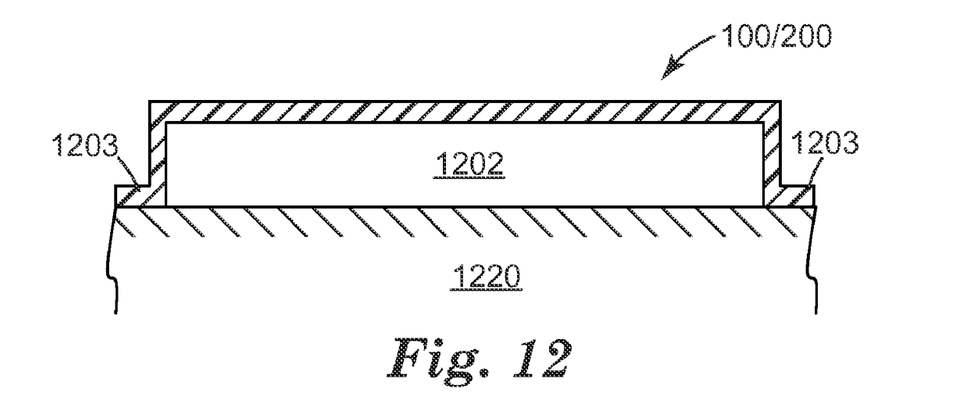
FIG. 12 is a cross-sectional view of another embodiment of the hybrid sound absorbing sheet of the present disclosure.

To generate a sound absorbing effect, hybrid sound absorbing sheet 100/200 can be placed at or near a sound-reflecting surface 1220, as shown in an exemplary manner in FIG. 12. In various embodiments, either the film layer or the foil layer can be placed facing the acoustic source (e.g., the incoming airborne sound). Further, hybrid sound absorbing sheet 100/200 may have a backing air space (gap) 1202 between the sheet and sound-reflecting surface 1220. The hybrid sound absorbing sheet of the present disclosure may exhibit a good sound absorbing effect even if the backing air space is relatively thin (such as, for example, about 1 mm to about 20 mm, about 1 mm to about 10 mm or about 1 mm to about 5 mm). If desired, the hybrid sound absorbing sheet may be formed into shapes. For example, the hybrid sound absorbing sheet can comprise flanges 1203 at one or more edges of the sheet, such that the sheet may be attached to sound-reflective surface 1220 by flanges 1203, with at least a portion of the sheet being sufficiently far from the sound-reflective surface that an air gap 1202 is present between that portion of the sheet and sound-reflective surface 1220.

The hybrid sound absorbing sheet 200 may be prepared by any known method such as those mentioned above. In particular, the perforated metal foil having embossed features can be prepared by known embossing methods using an embossing roller containing an embossing pattern that is transferred to the metal foil. (In both the embossing process, and the above-described perforation processes, a nip roller can be used if needed). Before or after the embossing process, the embossed metal foil may be perforated by known perforation method such as a method using a roll with needles. The perforation can be applied from either side of the metal foil, or both.

Figure 3:
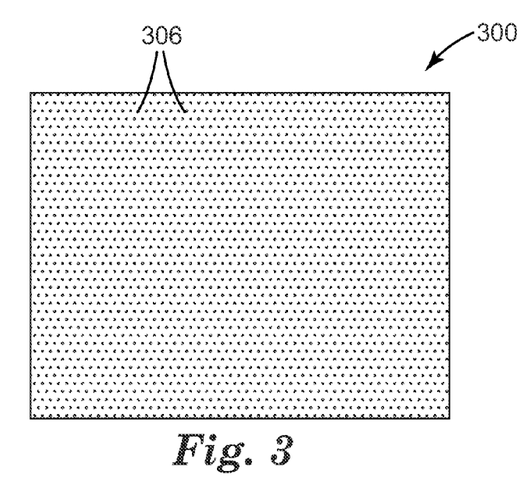
FIG. 3 is a top view of an exemplary microperforated film of the present disclosure.

FIG. 3 is a view of one embodiment of the microperforated film of the present disclosure. The film 300 includes through-micro bores 306 denoted by the dots in FIG. 3. The film may exhibit a Gurley air permeability of about 0.1 seconds per 100 cc to about 300 seconds per 100 cc. Such an air permeability may be produced, for example, by microperforating about 77,500 bores per square meter to about 6,200,000 bores per square meter, or about 620,000 bores per square meter to about 3,100,000 bores per square meter, with the bores comprising a diameter of from about 10 micrometers to about 200 micrometers. Other combinations of bore diameter and bore density may also be used to provide this range of air permeability.

Figure 4A:
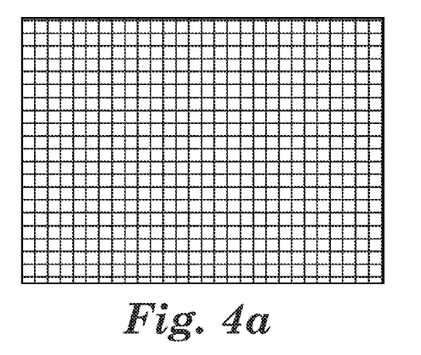
FIG. 4 is a view of several exemplary embossing patterns of the metal foil of the present disclosure.
Figure 4B:
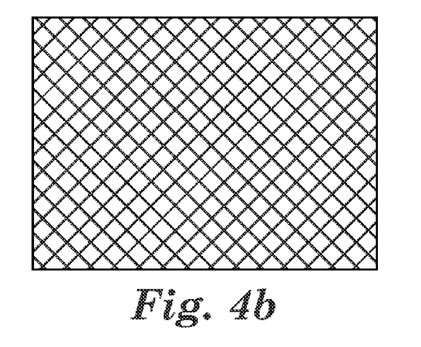
Figure 4C:
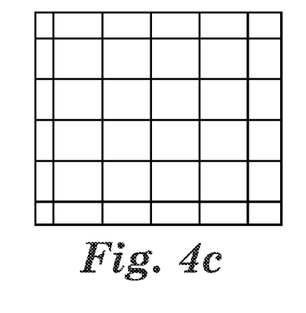
Figure 5:
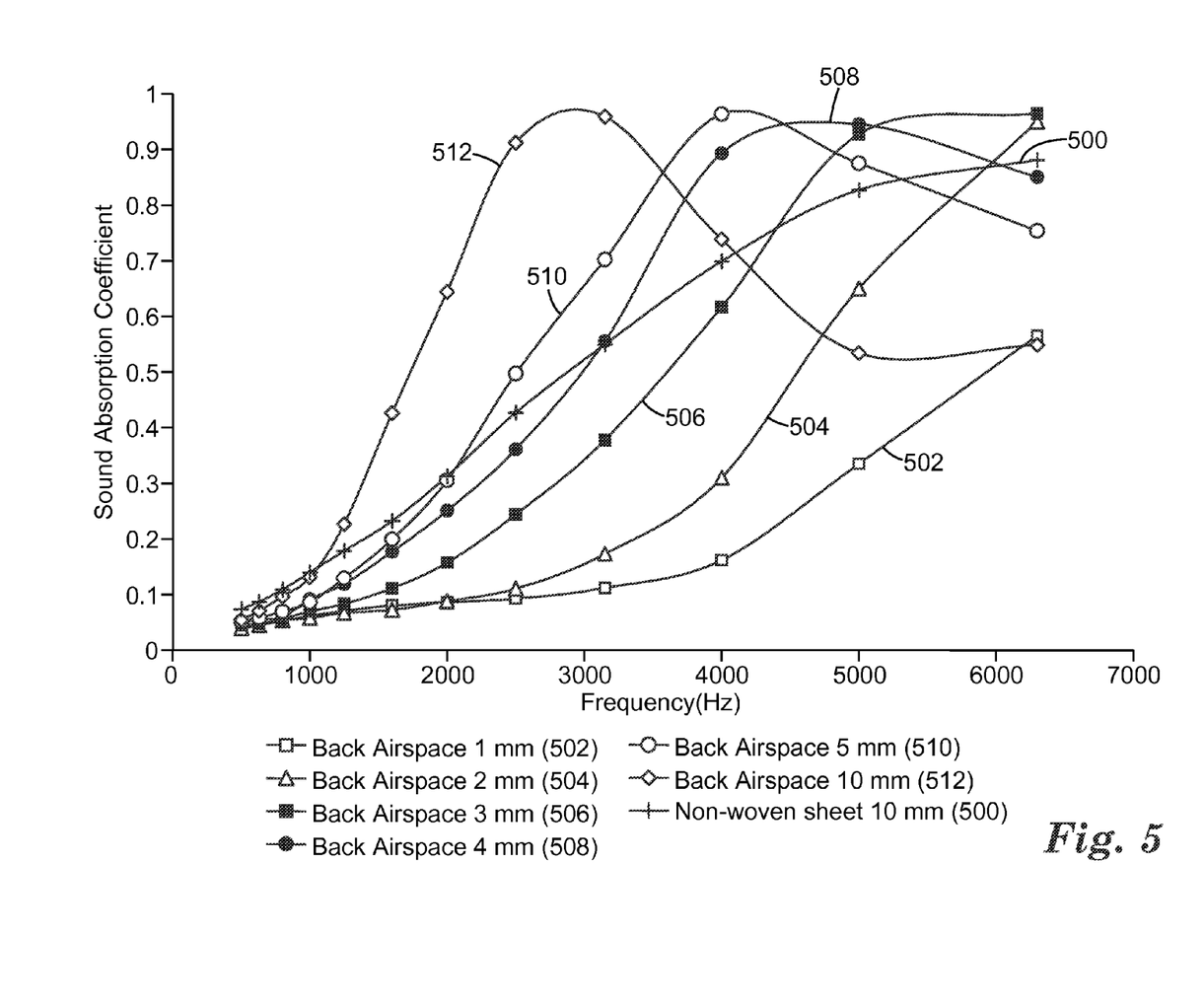
FIG. 5 is a graph of the sound absorption coefficient of hybrid sound absorbing sheets with various backing airspace thicknesses.

FIGS. 4a to 4c are views of exemplary embossing patterns of the metal foil. FIG. 4a shows an exemplary square grid pattern with about 1.5 mm pitch, FIG. 4b shows an exemplary diagonal square grid pattern with about 2.5 mm pitch, and FIG. 4c shows an exemplary square grid pattern with about 6.5 mm pitch FIG. 5 is a graph showing the sound absorption coefficient of hybrid sound absorbing sheets with various backing airspace thicknesses, in comparison to a nonwoven sheet. (For comparison, spectrum 500 shows the sound absorption coefficient for a nonwoven sheet of about 10 mm thickness. In this and in other examples, the 10 mm nonwoven sheet comprised a melt-blown polypropylene web of about 200 grams/square meter density, with a spun-bonded scrim.) As used herein, the term "backing airspace" means the distance between a sound-reflecting surface which is on the opposite side of the hybrid sound absorbing sheet from the acoustic source. The other spectra are for a hybrid sound absorbing sheet comprising a 12 micrometer thick microperforated PET film with through-micro bores of average diameter of about 100 micrometers, at a density of 1,240,000 bores per square meter and a 35 micrometer thick perforated copper foil disposed on the PET film by spraying adhesive (available from Sumitomo 3M Company under the designation Spray Adhesive 33) onto the smooth side of the perforated copper foil (that is, the side from which the foil was perforated) and applying the microperforated PET film to the adhesive-bearing side of the perforated copper foil. The microperforated PET film comprised a weight of about 17 grams per square meter and an air permeability of about 0.4 seconds per 100 cc. The perforated copper foil included holes having a diameter of about 0.7 mm with a density of about 72,600 holes per square meter. The copper foil was embossed in square grid pattern similar to that shown in FIG. 4a, with a pitch of about 1.5 mm. The embossing depth was about 72 micrometers. The thickness of the copper foil including the emboss depth was about 105 micrometers. The hybrid sound absorbing sheet was tested for sound absorption at various backing airspace thicknesses, as shown in FIG. 5. All sound-absorption spectra (in this and all other examples) were generated in accordance with ASTM E 1050, using well-known impedance tube testing. For film samples and hybrid sheet samples, the sample was positioned in the impedance tube by spanning a 29 mm diameter section of the film or hybrid sheet across opening of the impedance tube, with the edges of the sample adhered to the flange of the impedance tube opening using double-sided adhesive, so that the sheet was disposed normal to the incident sound (in these experiments, the hybrid sound absorbing sheet was positioned so that the acoustic source faced the microperforated PET film). The reflective surface of the impedance tube (behind the sample from the acoustic source) was adjusted to provide a backing airgap of thickness (depth) shown in the various spectra of FIG. 5. For the nonwoven sample, the nonwoven was placed directly against the reflective surface of the impedance tube with no air gap.

Figure 6:
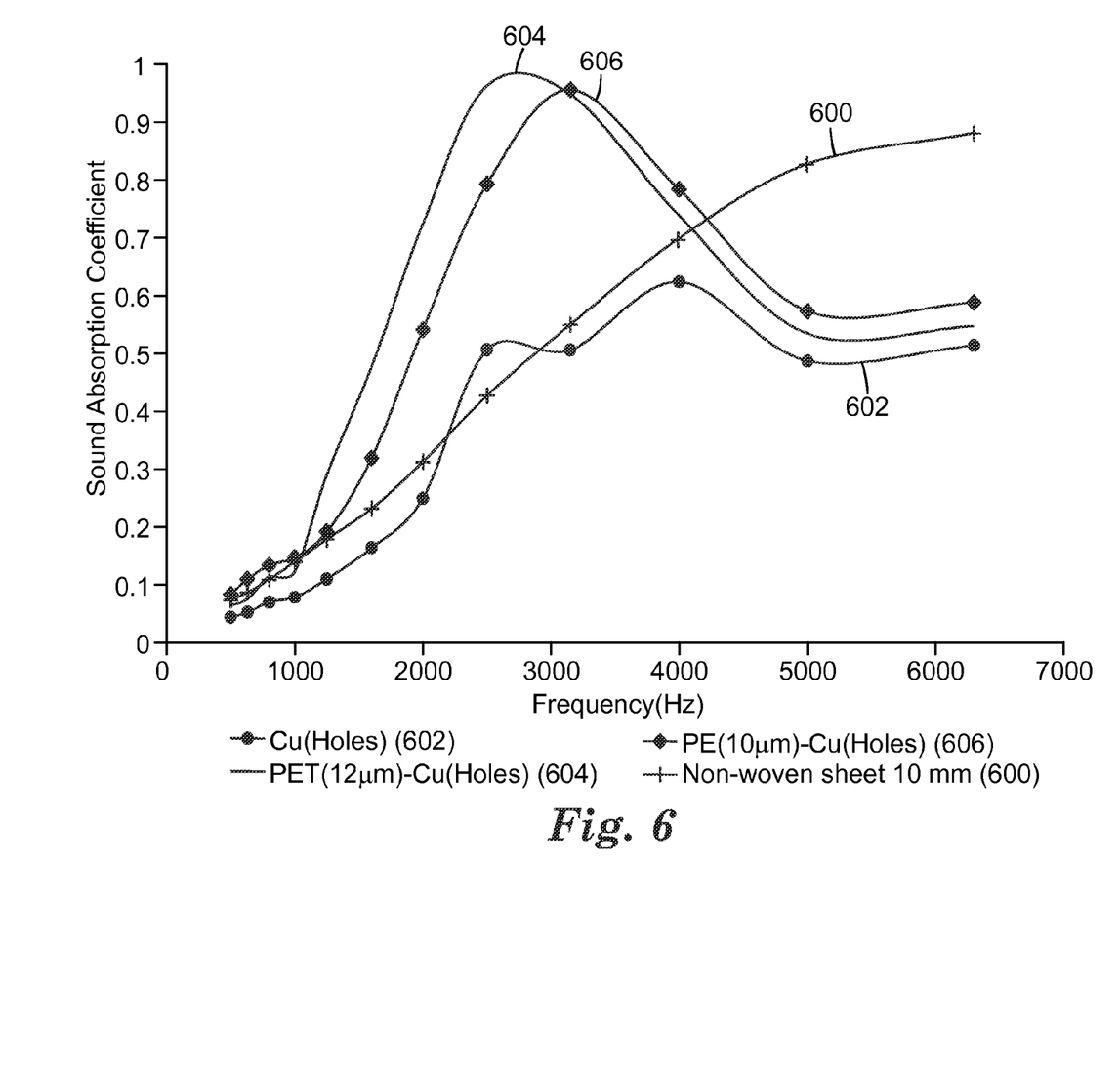
FIG. 6 is a graph of the sound absorption coefficient of a perforated metal foil and of various hybrid sound absorbing sheets.

FIG. 6 is a graph showing the sound absorption coefficient of a metal foil and of hybrid sound absorbing sheets, in comparison to a nonwoven sheet. Spectrum 600 depicts the sound absorption coefficient of the 10 mm thick non-woven sheet of FIG. 5, without a backing airspace. Spectrum 602 depicts the sound absorption coefficient of a 35 micrometer thick perforated copper foil with 1.5 mm pitch square grid pattern (similar to that shown in FIG. 4a) emboss having about 72 micrometers depth. The thickness of the copper foil including the emboss depth was about 107 micrometers. The perforated copper foil included holes having a diameter of about 0.7 mm with a density of about 72,600 holes per square meter. The microperforated film and the perforated foil were disposed together to form the hybrid sound absorbing sheets of this example in similar manner to that described above for the sheet of FIG. 5 (that is, by spraying hot-melt adhesive onto the smooth side of the foil and contacting the microperforated film to the adhesive-bearing side of the foil). Spectrum 604 depicts the sound absorption coefficient of a hybrid sound absorbing sheet including the above-described perforated copper foil and the microperforated PET film of spectrum 502. Spectrum 606 depicts the sound absorption coefficient of a hybrid sound absorbing sheet comprising the above-described perforated copper foil and a 10 micrometer thick microperforated PE (polyethylene) film. The PE film included the same number of bores and bore diameter as the PET film of spectrum 604. The air permeability and the weight of the PE film were about 0.3 seconds per 100 cc and 8.2 grams per square meter, respectively. The backing airspace for the sound absorber for spectra 602, 604 and 606 was 10 mm. All the spectra in FIG. 6 were generated in similar manner to those described with reference to FIG. 5.

Figure 7:
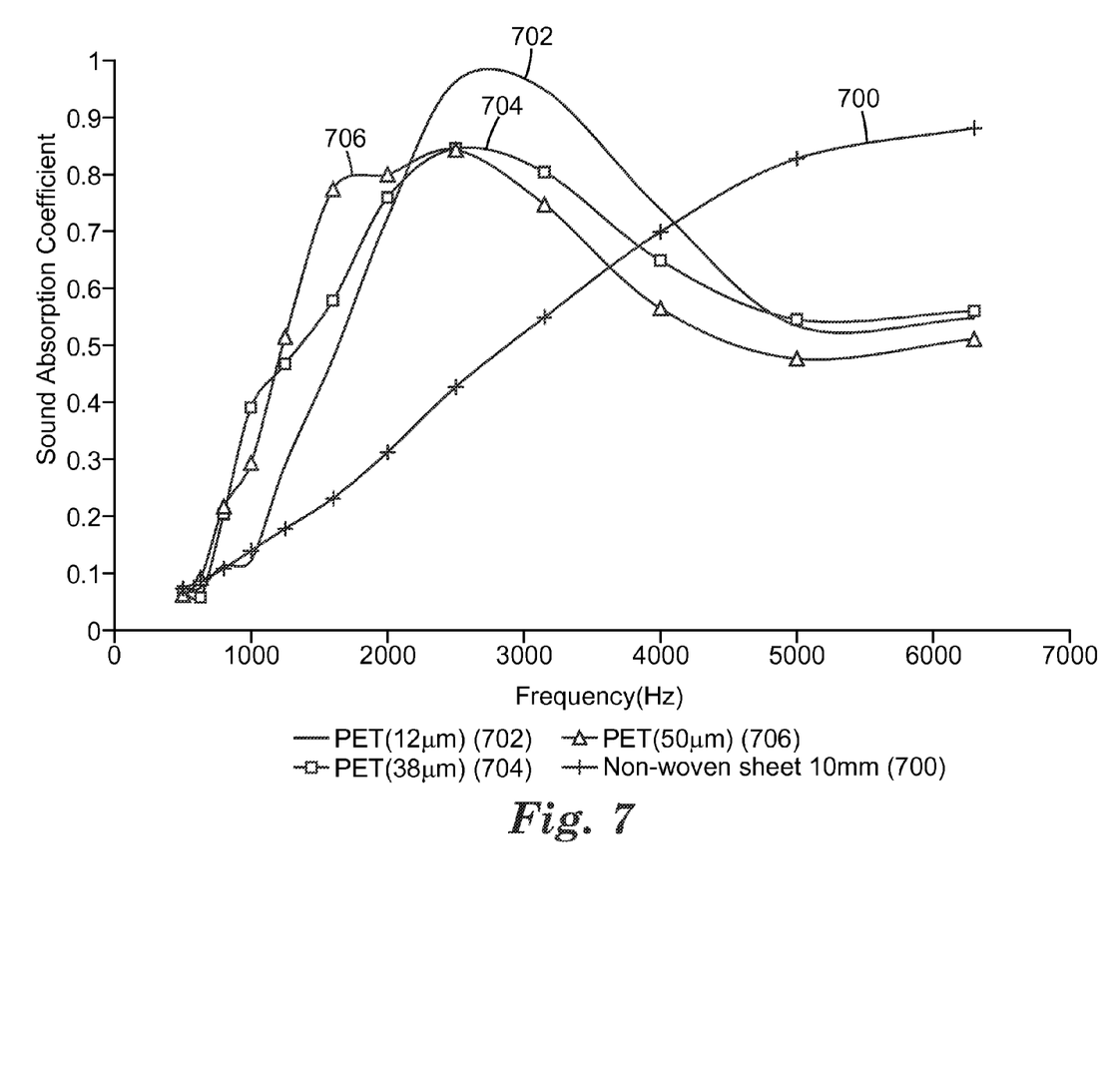
FIG. 7 is a graph of the sound absorption coefficient of hybrid sound absorbing sheets containing microperforated films of various thicknesses.

FIG. 7 is a graph showing the sound absorption coefficient of hybrid sound absorbing sheets comprising microperforated films of various thicknesses, in comparison to a non-woven sheet. Spectrum 700 depicts the sound absorption coefficient of the 10 mm thick non-woven sheet of FIG. 5, without a backing airspace. Each sample used for spectra 702, 704 and 706 included the perforated copper foil of spectrum 502 and a microperforated PET film. The thickness of the PET film for spectra 702, 704 and 706 was 12 micrometers, 38 micrometers and 50 micrometers respectively. Each of the PET films included about 1,240,000 bores per square meter, with the bores having an average diameter of about 100 micrometers. The air permeability of the PET films was about 0.4 seconds per 100 cc for 702, about 0.8 seconds per 100 cc for 704 and about 1.6 seconds per 100 cc for 706. The weight of the PET film was about 17 grams per square meter for 702, about 53 grams per square meter for 704 and about 70 grams per square meter for 706. The total thickness of the sounds absorbers for 702, 704 and 706 were 119 micrometers, 145 micrometers, and 157 micrometers, respectively. The backing airspace was 10 mm. The microperforated film and the perforated foil were disposed together to form the hybrid sound absorbing sheets in similar manner to that described above for the sheet of FIG. 5. All the spectra in FIG. 7 were generated in similar manner to those described with reference to FIG. 5.

Figure 8:
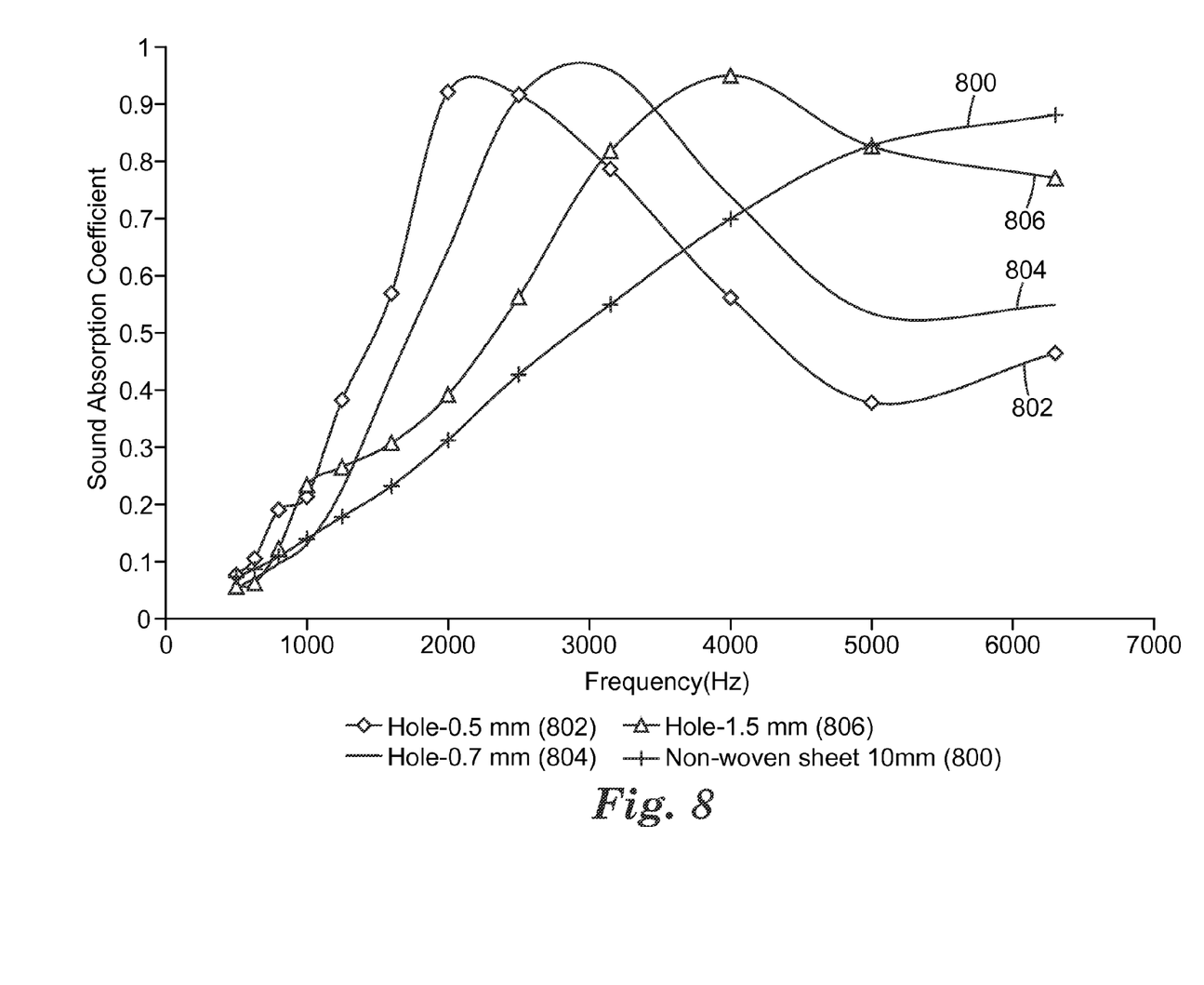
FIG. 8 is a graph of the sound absorption coefficient of hybrid sound absorbing sheets with various hole diameters of the perforated metal foil.

FIG. 8 is a graph showing the sound absorption coefficient of hybrid sound absorbing sheets with various hole diameters of the perforated metal foil, in comparison to a nonwoven sheet. Spectrum 800 depicts the sound absorption coefficient of the 10 mm thick non-woven sheet of FIG. 5, without a backing airspace. Each sample used for spectra 802, 804 and 806 included a 35 micrometer thick perforated copper foil with 1.5 mm pitch square grid embossed pattern (similar to that shown in FIG. 4a) with an embossing depth of about 72 micrometers, and the microperforated PET film of spectrum 502. The thickness of perforated copper foil including emboss depth was about 107 micrometers. The hole diameters of the perforated copper foil was 0.5 mm for 802, for 0.7 mm for 804 and 1.5 mm for 806. The density of the holes of the perforated copper foil was about 72,600. The backing airspace was 10 mm. The microperforated film and the perforated foil were disposed together to form the hybrid sound absorbing sheets in similar manner to that described above for the sheet of FIG. 5. All the spectra in FIG. 8 were generated in similar manner to those described with reference to FIG. 5.

Figure 9:
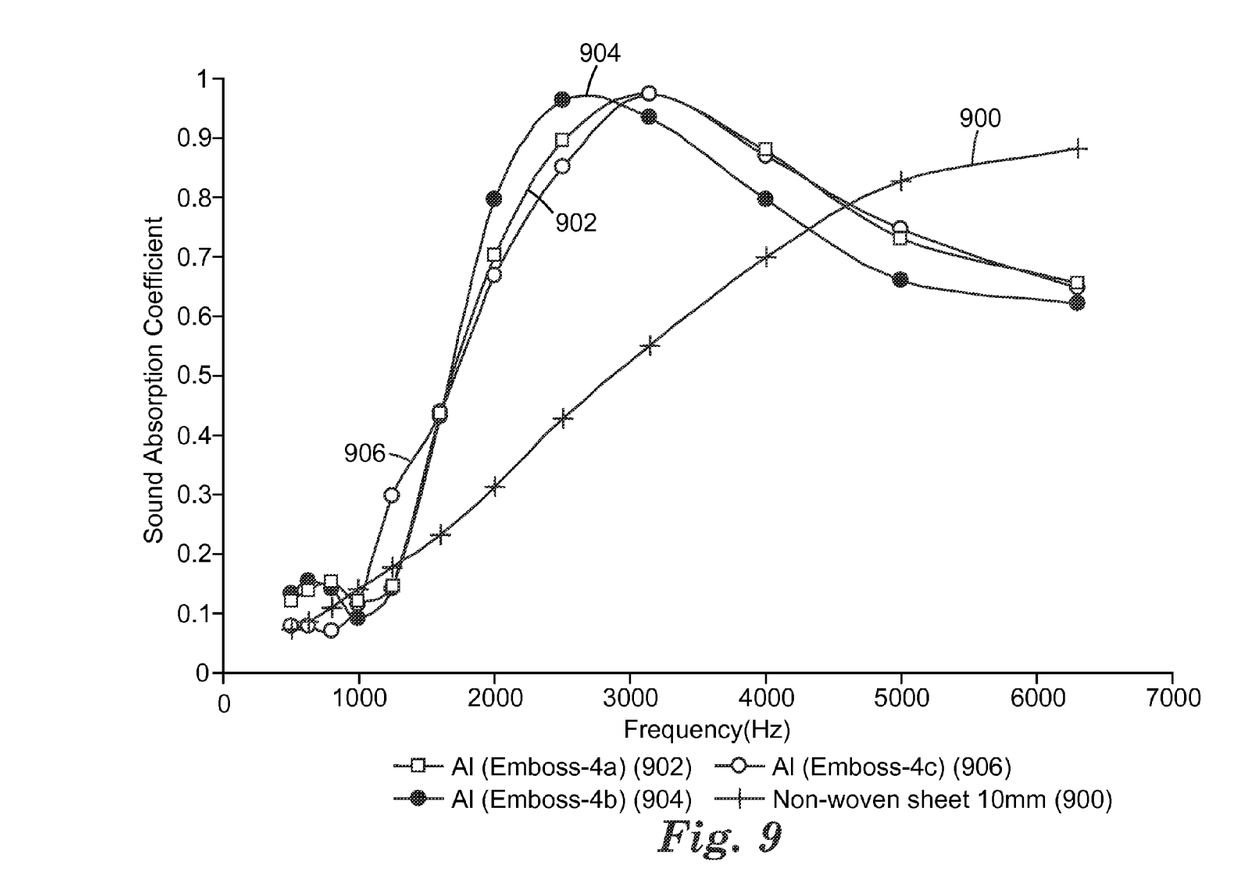
FIG. 9 is a graph of the sound absorption coefficient of hybrid sound absorbing sheets with various embossing patterns of the perforated metal foil.

FIG. 9 is a graph showing the sound absorption coefficient of hybrid sound absorbing sheets with various embossing patterns of the perforated metal foil, in comparison to a non-woven sheet. Spectrum 900 depicts the sound absorption coefficient of the 10 mm thick non-woven sheet of FIG. 5, without a backing airspace. Each sample for spectra 902 to 906 included the microperforated PET film of spectrum 502 and a 30 micrometer thick perforated hard aluminum foil. The backing airspace was 10 mm. The aluminum foil had 0.4 mm diameter holes with a density of about 171,000. An embossing pattern of a 1.5 mm pitch square grid pattern (FIG. 4a) was used for 902, a 2.5 mm pitch diagonal square grid pattern (FIG. 4b) for 904 and a 6.5 mm pitch square grid pattern (FIG. 4c) for 906. The depth of the embossing pattern was about 72 micrometers for 902, about 52 micrometers for 904 and about 102 for 906. The microperforated film and the perforated foil were disposed together to form the hybrid sound absorbing sheets in similar manner to that described above for the sheet of FIG. 5. All the spectra in FIG. 9 were generated in similar manner to those described with reference to FIG. 5.

Figure 10:
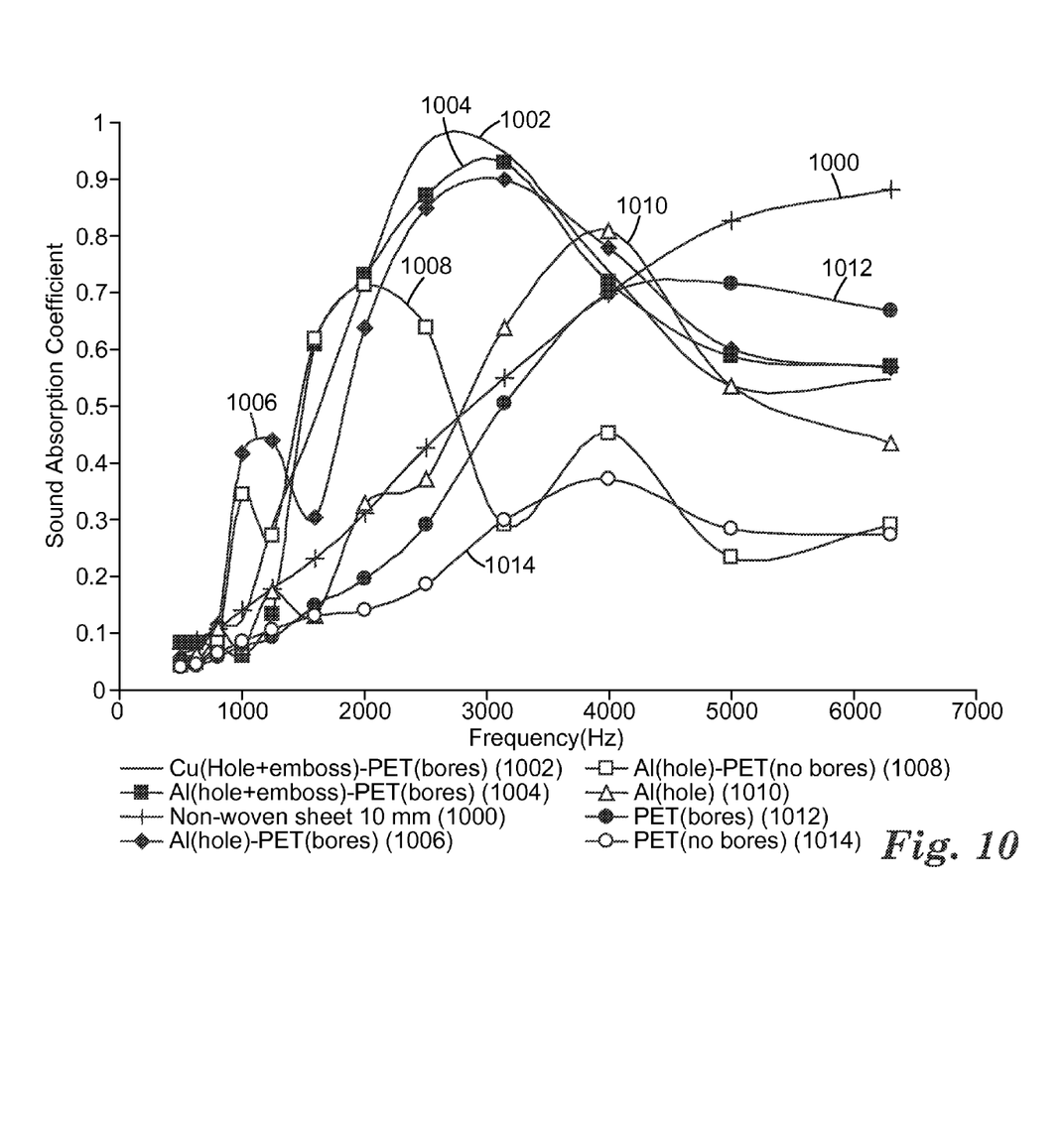
FIG. 10 is a graph of the sound absorption coefficient of various films and hybrid sound absorbing sheets.

FIG. 10 is a graph showing the sound absorption coefficient of films and of hybrid sound absorbing sheets with various combinations, in comparison to a nonwoven sheet. Spectrum 1000 depicts the sound absorption coefficient of the 10 mm thick non-woven sheet of FIG. 5, without a backing airspace. Spectrum 1002 depicts the sound absorption coefficient of the hybrid sound absorbing sheet described with reference to FIG. 5. Spectrum 1004 depicts the sound absorption coefficient of a hybrid sound absorbing sheet comprising the microperforated PET film of spectrum 502 (1002), and a 30 micrometer thick perforated hard aluminum foil of spectrum 902. Spectrum 1006 depicts the sound absorption coefficient of a hybrid sound absorbing sheet comprising the microperforated PET film of spectrum 502 (1002) and the perforated aluminum foil of spectrum 1004, except that the aluminum foil was not embossed. Spectrum 1008 depicts the sound absorption coefficient of the combination of a 12 micrometer thick unperforated PET film having about 17 grams per square meter of weight and the unembossed, perforated aluminum foil of spectrum 1006. Spectrum 1010 depicts the sound absorption coefficient of the perforated aluminum foil of spectrum 1006 (that is, the perforated foil of spectra 1006 and 1008, in the absence of any film, microperforated or not). Spectrum 1012 depicts the sound absorption coefficient of the microperforated PET film of spectrum 502 (1002) (that is, the microperforated PET film of spectra 1002, 1004 and 1006, in the absence of any perforated or unperforated foil). Spectrum 1014 depicts the sound absorption coefficient of the unperforated PET film of spectrum 1008, in the absence of any foil.

All the spectra in FIG. 10 were generated in similar manner to those described with reference to FIG. 5 Each sample used for spectra 1002, 1004, 1006 and 1008 was laminated by spot gluing, with the surface of the PET film facing the smooth side of the foil (that is, the side from which the foil was perforated). The spot gluing method resulted in a small air layer being present between portions of the PET film and the metal foil.

Figure 11:
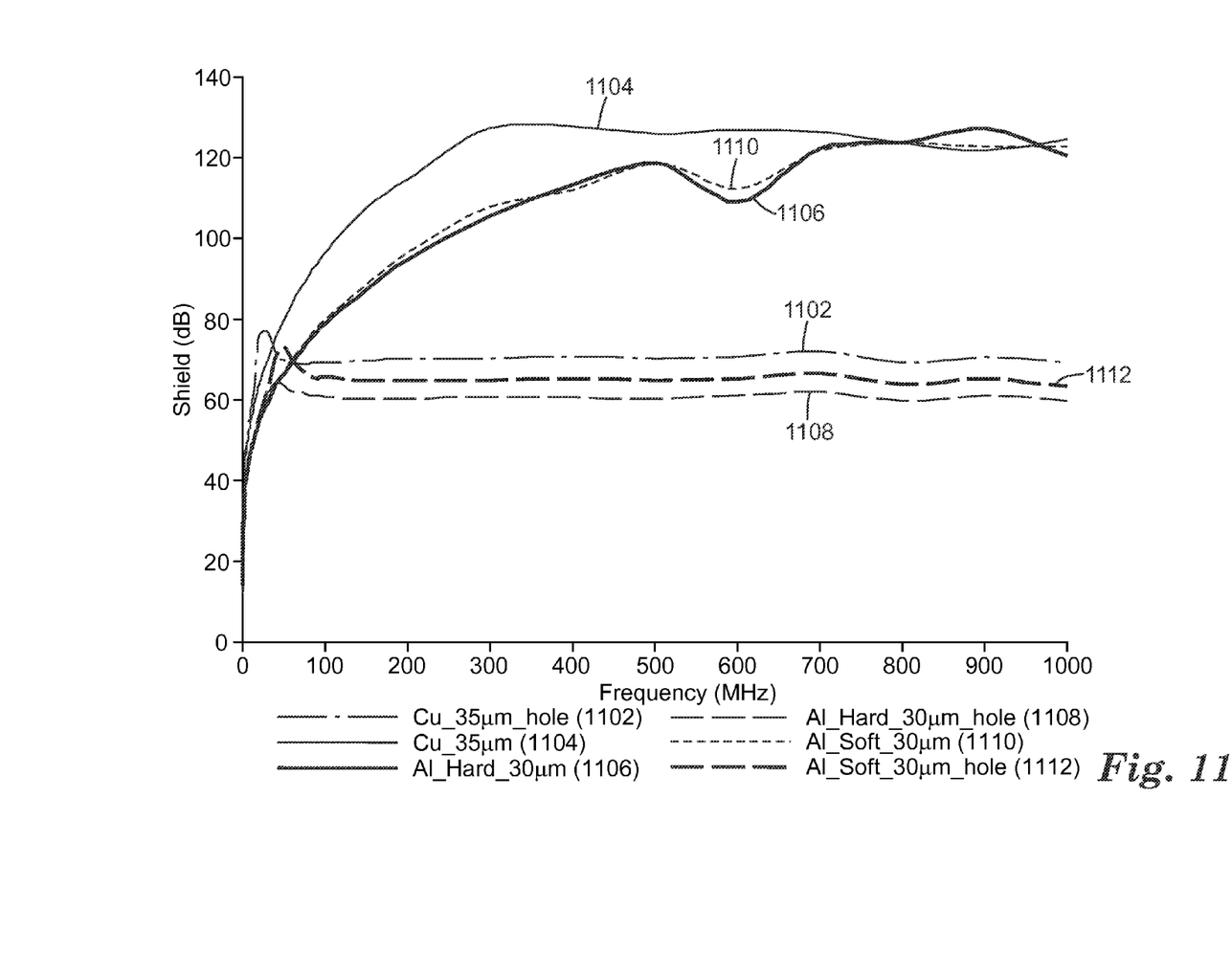
FIG. 11 is a graph illustrating an electromagnetic shielding property of various unperforated metal foils and perforated metal foils.

FIG. 11 is a graph illustrating an electromagnetic shielding property of various unperforated metal foils and perforated metal foils. All the spectra in FIG. 11 were generated in accordance with the KEC method, which is a shielding effectiveness measuring method developed by Kansai Electronic Industry Development Center. Based on electric field distribution in a TEM cell, EMI shielding effectiveness testing equipment has a testing space which symmetrically holds a sample between two opposite surfaces on a plane perpendicular to a signal transmission axis. A transmitting antenna is set in a way to generate an electromagnetic field and the signal level at a receiving antenna is measured. Field intensity attenuation is calculated by comparison of the signal levels at the transmitting and receiving antennas and this attenuation is a measure of shielding effectiveness. The testing space between the outgoing part and the receiving part was 10 mm and a frequency of 0.1 to 1000 MHz was used for the measurement. Generally, it is can be said that an article having 20 dB or more of shielding effect shields 90% or more of electromagnetic waves.

From the disclosure thus described, it will be obvious that the disclosure may be varied in many ways. Such variations are not to be regarded as a departure from the sprit and scope of the disclosure, and all such modifications as would be obvious to one skilled in the art are intended for inclusion within the scope of the following claims.

What is claimed is:

1. A hybrid sound absorbing sheet comprising:
   a microperforated film comprising through-micro bores present in a first pattern; and,
   a perforated metal foil comprising holes in a second pattern;
   wherein the perforated metal foil is disposed on the microperforated film,
   and wherein the first pattern of the through-micro bores in the microperforated film and the second pattern of the perforated metal foil comprise non-aligned patterns.

2. The hybrid sound absorbing sheet according to claim 1 further comprising an air gap between the microperforated film and the perforated metal foil.

3. The hybrid sound absorbing sheet according to claim 1 wherein the diameter range of the through-micro bores of the microperforated film is 10 micrometers to 200 micrometers.

4. The hybrid sound absorbing sheet according to claim 1 wherein the diameter range of the holes of the perforated metal foil is 0.1 mm to 3 mm.

5. The hybrid sound absorbing sheet according to claim 1 wherein the microperforated film has a Gurley air permeability of 0.1 seconds per 100 cc to 300 seconds per 100 cc.

6. The hybrid sound absorbing sheet according to claim 1 wherein the microperforated film has 77,500 bores per square meter to 6,200,000 bores per square meter.

7. The hybrid sound absorbing sheet according to claim 1 wherein the thickness of the microperforated film is 10 micrometers to 250 micrometers.

8. The hybrid sound absorbing sheet according to claim 1 wherein the thickness of the perforated metal foil is 10 micrometers to 250 micrometers.

9. The hybrid sound absorbing sheet according to claim 1 wherein the perforated metal foil is embossed.

10. The hybrid sound absorbing sheet according to claim 9 wherein the emboss depth is 30 micrometers to 1000 micrometers.

11. The hybrid sound absorbing sheet according to claim 1 wherein the total thickness of the hybrid sound absorbing sheet is 50 micrometers to 1600 micrometers.

12. The hybrid sound absorbing sheet according to claim 1 wherein the microperforated film comprises a material selected from the group consisting of polyethylene terephthalate (PET), polyethylene, polypropylene, polyvinyl chloride, and polyvinylidene chloride, and combinations thereof.

13. The hybrid sound absorbing sheet according to claim 1 wherein the perforated metal foil comprises a material selected from the group consisting of copper, aluminum, iron, tin, titanium, nickel, lead, zinc, silver, gold, stainless steel, brass, bronze, beryllium copper, and phosphor bronze, and combinations thereof.

14. The hybrid sound absorbing sheet according to claim 1 wherein the microperforated film is selected from the group consisting of polyethylene terephthalate film and polyethylene film, and the material that comprises the perforated metal foil is selected from the group consisting of copper and aluminum.

15. The hybrid sound absorbing sheet according to claim 1 wherein the microperforated film and the perforated metal foil are attached together by adhesive bonding.

16. The hybrid sound absorbing sheet according to claim 15 wherein the adhesive is present in discrete locations.

17. A method of absorbing sound comprising the steps of:
   providing the hybrid sound absorbing sheet of claim 1; and,
   positioning the hybrid sound absorbing sheet between an acoustic source and a sound-reflecting surface, with a backing airspace between the hybrid sound absorbing sheet and the sound-reflecting surface.

18. The method of absorbing sound according to claim 17, wherein the backing airspace between the hybrid sound absorbing sheet and the sound-reflecting surface is from about 1 mm to 20 mm in thickness.

19. The method of absorbing sound according to claim 17, wherein the backing airspace between the hybrid sound absorbing sheet and the sound-reflecting surface is from about 1 mm to 10 mm in thickness.

20. The method of absorbing sound according to claim 17, wherein the backing airspace between the hybrid sound absorbing sheet and the sound-reflecting surface is from about 1 mm to 5 mm in thickness.

21. A sound absorber, comprising:
a sound-reflecting surface;
the hybrid sound absorbing sheet of claim 1 disposed near the sound-reflecting surface with a backing airspace between the hybrid sound absorbing sheet and the sound-reflecting surface.

22. The sound absorber of claim 21, wherein the backing airspace between the hybrid sound absorbing sheet and the sound-reflecting surface is from about 1 mm to 20 mm in thickness.

23. The sound absorber of claim 21, wherein the backing airspace between the hybrid sound absorbing sheet and the sound-reflecting surface is from about 1 mm to 10 mm in thickness.

24. The sound absorber of claim 21, wherein the backing airspace between the hybrid sound absorbing sheet and the sound-reflecting surface is from about 1 mm to 5 mm in thickness.

* * * * *